Nov. 30, 1926.
H. O. RUSSELL ET AL
1,608,817
ELECTRICAL TACHOMETER
Filed March 9, 1922
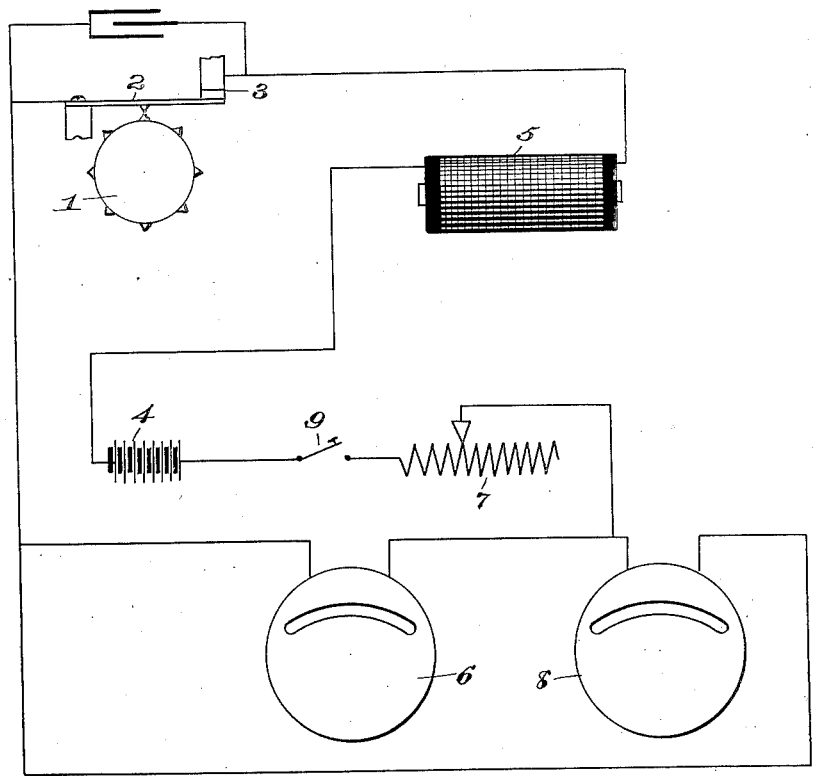
Inventors
H. O. Russell
E. A. Sipp
By Robert H. Young Atty.

Patented Nov. 30, 1926.

1,608,817

UNITED STATES PATENT OFFICE.

HERBERT O. RUSSELL, OF DETROIT, MICHIGAN, AND EDWARD A. SIPP, OF DAYTON, OHIO.

ELECTRICAL TACHOMETER.

Application filed March 9, 1922. Serial No. 542,505.

This invention consists in an apparatus for measuring electrically the revolutions per minute of a rotary element such for example, as the engine shaft of an airplane or automobile or the like.

The principle upon which the electrical speed indicator is based is the rate of change of current in a circuit including an impedance coil. This coil is connected in series with a constant voltage source of electrical energy and the current is made and broken by means of a cam and spring-operated breaker point.

The mechanism eliminates the use of a flexible shaft and is particularly well adapted to measure the speed of any rotating mechanical element at a great distance therefrom. The mechanism also admits of ready and accurate calibration of the meter for any particular installation or at any time during the life of the apparatus.

The accompanying drawing is a view partly in elevation and partly in diagram of the improved apparatus.

The mechanism embodies a cam 1 driven directly by the rotating element, the R. P. M. of which is to be indicated. 2 designates a cam follower and breaker spring which opens and closes the circuit through the breaker points 3. 4 represents a source of electrical energy connected in series with the impedance coil 5. A manually controlled rheostat 7 is placed in series to maintain a constant voltage, the voltage being indicated in a voltmeter 8. A main circuit switch 9 is connected in the line to place the apparatus in or out of use. A special ammeter 6 is also used and calibrated or graduated to read in revolutions per minute instead of amperes.

Operation of the mechanism is dependent primarily upon a constant voltage source of electrical energy and the number of times the circuit or current is made and broken per unit time by means of action of the cam and breaker mechanism. The current from the impedance coil which is recorded on the special ammeter is proportional to the length of the time the current is made in the primary circuit and the decreasing or increasing value of the current therefore will be dependent proportionally upon the increase or decrease in speed respectively.

What we claim is:

1. In an electrical tachometer, a constant voltage source of electrical energy, a voltage meter and a manually operable rheostat in circuit with said source of electrical energy and adapted to regulate the voltage of the same, make and break means, a rotary element operating said make and break means, an impedance coil in circuit in series with said source of energy, said circuit including an instrument for recording the speed of said rotary element and a switch for opening and closing said circuit.

2. In an electrical tachometer, a constant voltage source of electrical energy, a voltage meter and a manually operable rheostat in circuit with said source of electrical energy and adapted to regulate the voltage of the same, make and break means, means for operating said make and break means proportional to the speed to be recorded, an impedance coil in circuit in series with said source of energy, said circuit including an instrument for recording the speed of said means for operating said make and break means and a switch for opening and closing said circuit.

In testimony whereof we affix our signatures.

HERBERT O. RUSSELL.
EDWARD A. SIPP.